United States Patent [19]
Carlson et al.

[11] Patent Number: 5,816,372
[45] Date of Patent: Oct. 6, 1998

[54] MAGNETORHEOLOGICAL FLUID DEVICES AND PROCESS OF CONTROLLING FORCE IN EXERCISE EQUIPMENT UTILIZING SAME

[75] Inventors: J. David Carlson, Cary, N.C.; David M. Catanzarite, Edinboro, Pa.

[73] Assignee: Lord Corporation, Cary, N.C.

[21] Appl. No.: 304,005

[22] Filed: Sep. 9, 1994

[51] Int. Cl.$^6$ ..................................... F16F 15/03
[52] U.S. Cl. ..................... 188/267.2; 188/290; 188/155; 482/903
[58] Field of Search .................................. 188/155, 267, 188/290, 267.1, 267.2; 482/903, 111, 112

[56] References Cited

U.S. PATENT DOCUMENTS

| | | | |
|---|---|---|---|
| Re. 34,479 | 12/1993 | Minoura | 482/61 |
| Re. 34,959 | 5/1995 | Potts | 482/52 |
| 2,544,360 | 3/1951 | Schmidt | 192/12 |
| 2,575,360 | 11/1951 | Rabinow | 192/21.5 |
| 2,605,876 | 8/1952 | Becker | 192/21.5 |
| 2,607,542 | 8/1952 | Spillman | 241/45 |
| 2,622,713 | 12/1952 | Rabinow | 192/21.5 |
| 2,629,471 | 2/1953 | Rabinow | 192/21.5 |
| 2,635,483 | 4/1953 | Welsh | 74/574 |
| 2,640,364 | 6/1953 | Nelson | 74/199 |
| 2,650,684 | 9/1953 | English, Jr. et al. | 192/21.5 |
| 2,663,809 | 12/1953 | Winslow | 310/78 |

(List continued on next page.)

FOREIGN PATENT DOCUMENTS

| | | |
|---|---|---|
| 4697936/12 | 6/1989 | Russian Federation . |
| 4851931/12 | 7/1990 | Russian Federation . |
| WO 94/01181 | 7/1993 | WIPO . |
| WO A 94 01181 | 1/1994 | WIPO . |

OTHER PUBLICATIONS

Further Developments of the NBS Magnetic Fluid Clutch, National Bureau of Standards, Technical News Bulletin, vol. 34, Dec. 1950, No. 12, pp. 169–174.

E. S. Bettis and E. R. Mann, A Servo Employing the Magnetic Clutch, The Review of Scientific Instruments, vol. 20, No. 2, Feb., 1949, pp. 97–102.

Magnetic Fluid Clutch, Electronics, Nov. 1949, pp. 100–103.

Elberty, Robert S., Clutches . . . Characteristics and Design of Magnetic Fluid Types, Machine Design, May 1949, pp. 98–102.

Rabinow, Jacob, The Magnebic Fluid Clutch, AIEE Transactions, vol. 67, 1948, pp. 1308–1315.

J. D. Carlson et al., Control of a Fall–Safe Tether Using an Er–Fluid Brake, Electrotheological Fluids, Proceedings of the Second International Conference on ER Fluids, Aug. 7–9, 1989, pp. 426–436.

Kordonsky, William I., "Adaptive Structures Based on Magnetorheological Fluids", Published by Technomic, 1992. ISBN–0–87762–932–3.

*Primary Examiner*—Peter M. Poon
*Attorney, Agent, or Firm*—Randall S. Wayland

[57] ABSTRACT

The invention relates to magnetorheological (MR) fluid devices and the process of controlling the force in exercise equipment by utilizing the MR fluid devices. The MR fluid devices include rotary and linear acting varieties and are useful for controlled forces in exercise bicycles, recumbent exercisers, ski machines, rowing machines, and stair stepper machines. The rotary MR fluid device is comprised of a rotor supported by bearings and received within a housing. An MR fluid is received adjacent the rotor and within a cavity in the housing and the MR fluid is controlled by an applied magnetic field to vary the operating torque resistance. Spring biasing the rotor allows for relaxed tolerances. Optimization of the Ri/Ro ratio is described which reduces the size and weight of the device. The linear acting version utilizes simple extensible pumps and an external MR fluid valve to provide a modularized system.

32 Claims, 7 Drawing Sheets

U.S. PATENT DOCUMENTS

| | | | |
|---|---|---|---|
| 2,673,631 | 3/1954 | Gold | 192/21.5 |
| 2,693,261 | 11/1954 | Winther | 192/21.5 |
| 2,733,792 | 2/1956 | Saxl | 192/21.5 |
| 2,756,852 | 7/1956 | Findley | 192/21.5 |
| 2,886,151 | 5/1959 | Winslow | 192/21.5 |
| 2,916,944 | 12/1959 | Diesfeld | 74/472 |
| 2,948,371 | 8/1960 | Lehde | 192/12 |
| 2,987,153 | 6/1961 | Perry | 192/21.5 |
| 3,048,046 | 8/1962 | Cosby | 74/191 |
| 3,106,850 | 10/1963 | Clisset | 7/61 |
| 3,176,809 | 4/1965 | Monroe | 192/12 |
| 3,216,542 | 11/1965 | Comstock | 192/21.5 |
| 3,250,341 | 5/1966 | Takahashi | 180/77 |
| 3,266,606 | 8/1966 | Barrett | 192/21.5 |
| 3,270,841 | 9/1966 | Grau | 192/21.5 |
| 3,305,055 | 2/1967 | Slaughter | 192/21.5 |
| 3,394,784 | 7/1968 | Searle | 192/21.5 |
| 3,613,842 | 10/1971 | Buciak | 188/306 |
| 4,200,003 | 4/1980 | Miller | 74/574 |
| 4,350,913 | 9/1982 | Eddens . | |
| 4,645,199 | 2/1987 | Bloemendaal | 272/73 |
| 4,674,608 | 6/1987 | Morris et al. | 188/290 |
| 4,768,630 | 9/1988 | Aubry et al. | 188/290 |
| 4,849,120 | 7/1989 | Price et al. | 252/62.52 |
| 4,852,424 | 8/1989 | Grassmuck et al. | 74/574 |
| 4,896,754 | 1/1990 | Carlson | 192/21.5 |
| 4,908,905 | 3/1990 | Kanno et al. | 16/82 |
| 4,920,929 | 5/1990 | Bishop | 123/41.49 |
| 4,942,947 | 7/1990 | Shtarkman | 188/267 |
| 4,967,887 | 11/1990 | Annacchino et al. | 192/21.5 |
| 5,007,513 | 4/1991 | Carlson | 192/21.5 |
| 5,015,926 | 5/1991 | Casler | 482/903 X |
| 5,026,046 | 6/1991 | DeCloux | 272/70 |
| 5,054,593 | 10/1991 | Carlson | 192/21.5 |
| 5,060,935 | 10/1991 | Dunn et al. | 272/70 |
| 5,076,573 | 12/1991 | Lo | 480/903 X |
| 5,081,882 | 1/1992 | Kogure | 74/574 |
| 5,090,531 | 2/1992 | Carlson | 192/21.5 |
| 5,122,819 | 6/1992 | Tecza | 188/306 |
| 5,165,507 | 11/1992 | Ohshima | 188/290 |
| 5,176,368 | 1/1993 | Shtarkman . | |
| 5,178,582 | 1/1993 | Maji et al. | 464/17 |
| 5,195,936 | 3/1993 | Mao | 482/112 |
| 5,257,681 | 11/1993 | Shartkman et al. | 188/267 |
| 5,277,281 | 1/1994 | Carlson et al. | 188/267 |
| 5,284,330 | 2/1994 | Carlson et al. | 267/140.14 |
| 5,382,208 | 1/1995 | Hu | 482/903 X |
| 5,409,435 | 4/1995 | Daniels | 482/5 |
| 5,460,585 | 10/1995 | Gentry et al. | 482/1 |
| 5,573,088 | 11/1996 | Daniels | 188/267 |

MAGNETORHEOLOGICAL FLUID DEVICES AND PROCESS OF CONTROLLING FORCE IN EXERCISE EQUIPMENT UTILIZING SAME

FIELD OF THE INVENTION

This invention relates to the area of rotary and linear acting fluid devices. Specifically, the invention relates to the area of magnetorheological fluid devices for providing controllable forces.

BACKGROUND OF THE INVENTION

Magnetorheological (MR) fluid devices include magnetorheological fluid, a medium having magnetizable particles suspended in a viscous fluid. MR dampers include both rotary and linear acting varieties. Rotary devices can be used as brakes, clutches and the like, while linear acting devices can be used for damping linear motion or for providing controllable dissipative forces. MR dampers have been incorporated in vehicle engine mounts. One such device is taught in U.S. Pat. No. 5,176,368 to Shtarkman which describes an engine mount connectable to a vehicle chassis and including gaps containing a magnetic fluid which is selectively energized to control the rheology thereof. This rheology change is used to control the engine motions by controlling the damping level. Other MR fluid devices are taught in the commonly assigned U.S. Pat. No. 5,284,330 and U.S. Pat. No. 5,277,281 to Carlson et al. which describe axially acting dampers and mounts including sealless designs.

U.S. Pat. No. 5,257,681 to Shtarkman et al. describes a rotary damper utilizing an MR fluid. U.S. Pat. No. 5,178,582 describes a dry powder coupling. The commonly assigned U.S. Pat. Nos. 5,090,531 and 5,054,593 to Carlson describes an electrophoretic fluid differential. Commonly assigned U.S. Pat. No. 5,007,513 to Carlson teaches the use of a ferrofluid seal on a controllable device. U.S. Pat. No. 4,967,887 to Annacchino et al. describes a soft start coupling utilizing magnetic particles. U.S. Pat. No. 4,350,913 to Eddens teaches another magnetic particle device. However, in particular, the rotary MR devices utilize an excess of flux-carrying material and must utilize tight tolerances to maintain the gap required for proper torque generation. Further, simple and effective linear acting devices have not been developed, whereas simple damper concepts may be required for specific applications. Prior linear dampers have incorporated the MR valve within the damper, thus exponentially complicating the design of the damper.

Exercise equipment applications have utilized various means of providing resistance. Prior exercising machines have utilized fluid resistance, air resistance, and friction resistance as passive means of providing resistive forces resisting motion of the user, and thus providing exercise for the muscles of the user. Further, eddy current devices have been utilized to provide resistance forces. However, these devices utilize large amounts of power and do not generate the smooth feel required. Further, they are not easily controlled.

SUMMARY OF THE INVENTION

Therefore, given the benefits and drawbacks of the prior art, the present invention is directed to magnetorheological (MR) fluid devices, and in particular, to the devices required for and the process of providing controlled forces in exercise equipment.

The rotary magnetorheological device comprises an outer housing forming an internal cavity, a shaft rotatably supported relative to the housing, and a rotor received in the cavity. The relative radii of the rotor and housing are selected to optimize the amount of material required and thus reduce the size of the device. In another aspect, the rotor is axially spring loaded to allow for simplified machining, larger machining tolerances, and reduced manufacturing costs.

The linear acting device is simple in that modular components are used thus reducing the manufacturing cost and simplifying the manufacturing techniques. The linear device includes a first pump, a second pump, and an external flow path interconnecting the two, and an external MR valve controlling the flow of fluid through the external flow path.

The present invention can minimize the amount of steel utilized to form the flux path, thus resulting in a lighter and more compact device.

Using MR devices on exercise equipment can enable the amount of operating power required to provide controlled resistance forces to be dramatically reduced.

The use of MR devices on exercise equipment enables a non-jarring and smooth feel to be achieved.

Using MR devices on exercise equipment permits the force control characteristic to be altered to provide optimum workout or optimum force curve characteristics.

The abovementioned and further aspects, features and advantages of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

FIG. 14 is a side view of the magnetorheological fluid device for being utilized on stair steppers and the like.

DETAILED DESCRIPTION OF THE INVENTION

Figure 1:
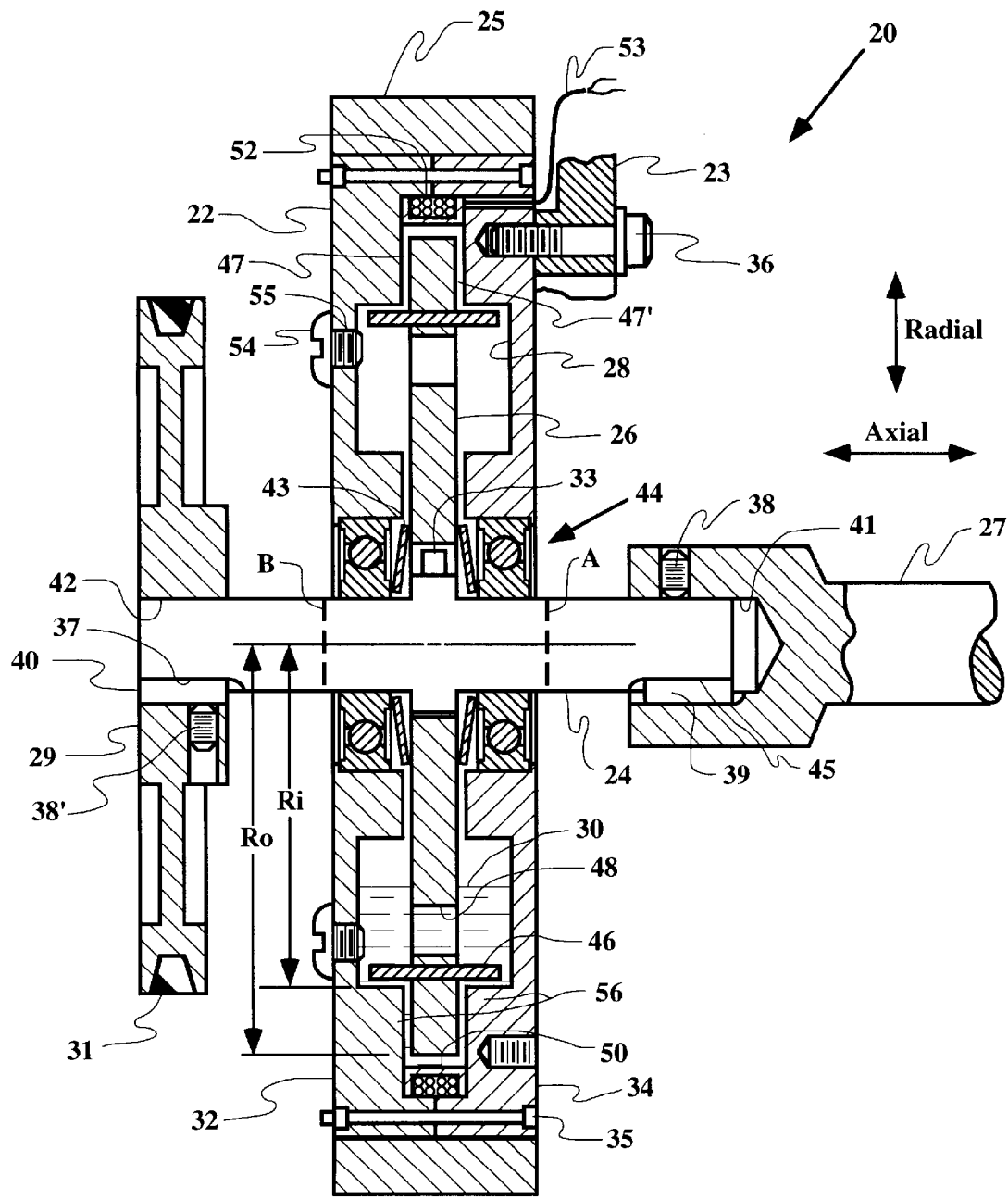
FIG. 1 is a partially sectioned side view of the present invention magnetorheological fluid device.

With reference to the various figures wherein like reference characters are employed where possible to indicate like parts, there is shown in FIG. 1 a magnetorheological (MR) fluid device 20, in this case a rotary magnetorheological brake comprising a shaft 24 for attaching to a first member such as transmission shaft 27 or pulley 29, and a housing 22 for attaching to a second member such as a split pillow block 25 or a flange 23. The split pillow block 25 preferably has two matching halves which form a cylinder for lockingly receiving the periphery of the MR device 20. Alternatively, flange 23 may be attached via fastener 36. The shaft 24 is rotatably received and supported by said housing 22 via bearings 44. The bearings 44 are of the sealed ball bearing type and are press fit onto shaft 24 and also into cylindrical pockets within the housing 22.

A rotor 26 is received by said shaft 24 and is only partially restrained such that the rotor 26 can slide relative to the shaft 24 in the axial direction. The rotor 26 may be slidably received such that it may float axially, yet it is restrained from torsional movement by rift pin 33. Rift pin 33 presses into shaft 24 and is received in a slot formed in the rotor 26. The rotor 26 includes a first rotor surface and a second rotor surface which are outwardly facing and generally radially extending. Ideally, the rotor 26 is disc-like. Springs 43 spring bias, or load, the rotor 26 such that it is centered within cavity 28 and centered relative to halves 32 and 34 of the housing 22.

The key point is that gaps 47 and 47' are maintained at the correct gap thickness. The rotor 26 has an outer radius Ro defining the outer periphery of the rotor 26. By way of example, typical gap thicknesses would need to be maintained at about 0.010–0.015 inch for optimum operation. Ideally, these gaps 47 and 47' would be equal in thickness. Spring loading allows for relaxed tolerances on components and assembly operations. Ideally Belleville washers are used to provide the spring bias. However, other types of springs besides Belleville could be utilized as well, such as coil, leaf, or reed springs or the like. Friction reducing material such as Teflon or the like may be added to the rotor 26 and or bearing 44 to reduce the friction of springs 43 on rotor 26 and/or bearing 44.

The shaft 24 of the MR fluid device 20 may attach to either the pulley 29 alone or the transmission shaft 27 alone. If the shaft 27 alone were used, the shaft 22 could end at line B. Likewise, if the pulley 29 alone were used, shaft 24 could terminate at line A. The pulley 29 is attached to shaft 24 by aligning key 40 with keyway 37 and inserting shaft 24 in bore 42. Set screw 38' is used to retain pulley 29 fixedly to shaft 24. A v-belt 31 is used to drive the pulley 29 which in turn drives the MR fluid device 20.

Similarly, the shaft 24 may attach to transmission shaft 27 by aligning key 39 with keyway 45, sliding shaft 24 into bore 41 and securing set screw 38.

For ease of manufacturing the housing 22 which is attachable to the second member is made up of essentially identical first and second halves 32 and 34. Each halve 32 and 34 includes a hollowed out section which together form a hollowed out cavity 28. In this embodiment fasteners 35 fasten the halves 32 and 34 together. A somewhat compliant bobbin 50 which is wound with a coil 52 of preferably coated copper wire may form a seal to prevent MR fluid 30 from leaking from the outer periphery of the housing 22. Specifically, the bobbin 50 is made about 0.005 inch oversize to seal the cavity 28 upon being compressed axially by tightening fasteners 35. Alternately, o-rings, gaskets or sealing compounds (not shown) may seal the halves 32 and 34.

The housing 22 includes a recess formed in the hollowed out section or cavity 28. The cavity and recess together partially define a flux member 56 which provides a magnetic flux path. In this embodiment, the flux member has a U-shaped cross section. The recess in the flux member 56 includes a inner radius Ri forming an innermost periphery and includes a first inner surface and a second inner surface which face each other. A portion of the rotor 26 is inserted into the recess and forms the first gap between the first inner surface and the first rotor surface and a second gap between said second inner surface and said second rotor surface.

An MR fluid 30 is placed in the cavity 28 and comprises the working fluid. An ideal MR fluid 30 will contain ferromagnetic particles such as carbonyl iron spheroids of about 4 microns in diameter disbursed in a viscous fluid such as silicone oil which has a viscosity of between about 1,000 and 50,000 mPa-s. Ideally, the cavity 28 will be hollowed out and will have contained within it, but only partially filling it, an MR fluid 30. It is desired that the cavity 28 only be about one third, or less, full such that the sealed bearings 44 are not immersed in the MR fluid 30 when not rotating. There should be enough fluid to substantially fill the first and second gaps 47 and 47' when rotating. The depth of fluid shown is illustrative of the amount of MR fluid 30 in the settled and non-rotating condition. One of the biggest problems of the prior devices is seal wear when the seal is exposed to the highly abrasive MR fluid. Only partially filling the cavity 28 solves this problem. The MR fluid 30 is inserted into cavity 28 through fill port 55. Fill plug 54 is used to plug port 55 after the fill operation. Fill ports 55 are optional as the MR fluid 30 may be inserted during an assembly operation. Mixing pins 46 which protrude from rotor 26 are used to make sure that the MR fluid 30 remains in a slurry state, i.e., the mixing pins 46 mix or agitate the iron spheroids into the base fluid. Further, mixing holes 48 may be utilized to perform the same function. It is notable, that with proper selection of the fluid and particles for the MR fluid 30, the need for mixing may be eliminated or minimized. The rotor 26 should have at least two pins 46 or holes 48, however, for balancing purposes; the holes 48 and/or pins 46 should be evenly disbursed about the rotor 26 to maintain dynamic balance.

In order to minimize the amount of steel in the magnetic circuit, it is desired to keep the ratio of Ri/Ro to between 0.70 and 0.99. This has the benefit of reducing the weight and size of the device as well as optimizing the magnetic flux, i.e., it allows the magnetic flux density in the fluid filled gaps 47 and 47' to be high without magnetic saturation occurring in the steel. Ideally, the flux path should act uniformly across the gap 47 and 47' in the region between Ri and Ro when the coil is energized with the appropriate current. The current can be either constant or adjustable in some fashion to provide controllability to the torque characteristics. Applying a current within the coil 52 which is adjacent the first and second gaps 47 and 47' creates a standing magnetic field within the flux member 56 which creates a magnetic attraction between the iron particles within the MR fluid 30 contained in the cavity 28. This causes the MR fluid 30 to behave as though there were an apparent change in its viscosity, i.e., the fluid changes in rheology, thus increasing the drag or restraining forces that are experienced between the rotor 26 and the halves 32 and 34 of the housing 22. The coil 52 is energized via an external controller and /or power supply (not shown) by way of lead 53. One of the key advantages of utilizing the MR fluid devices is that they only require small amounts of current (typically less than one ampere of electrical current) to develop significant resistance forces. Therefore, they lend themselves to battery operation and are ideally suited for exercise equipment.

Figure 2:
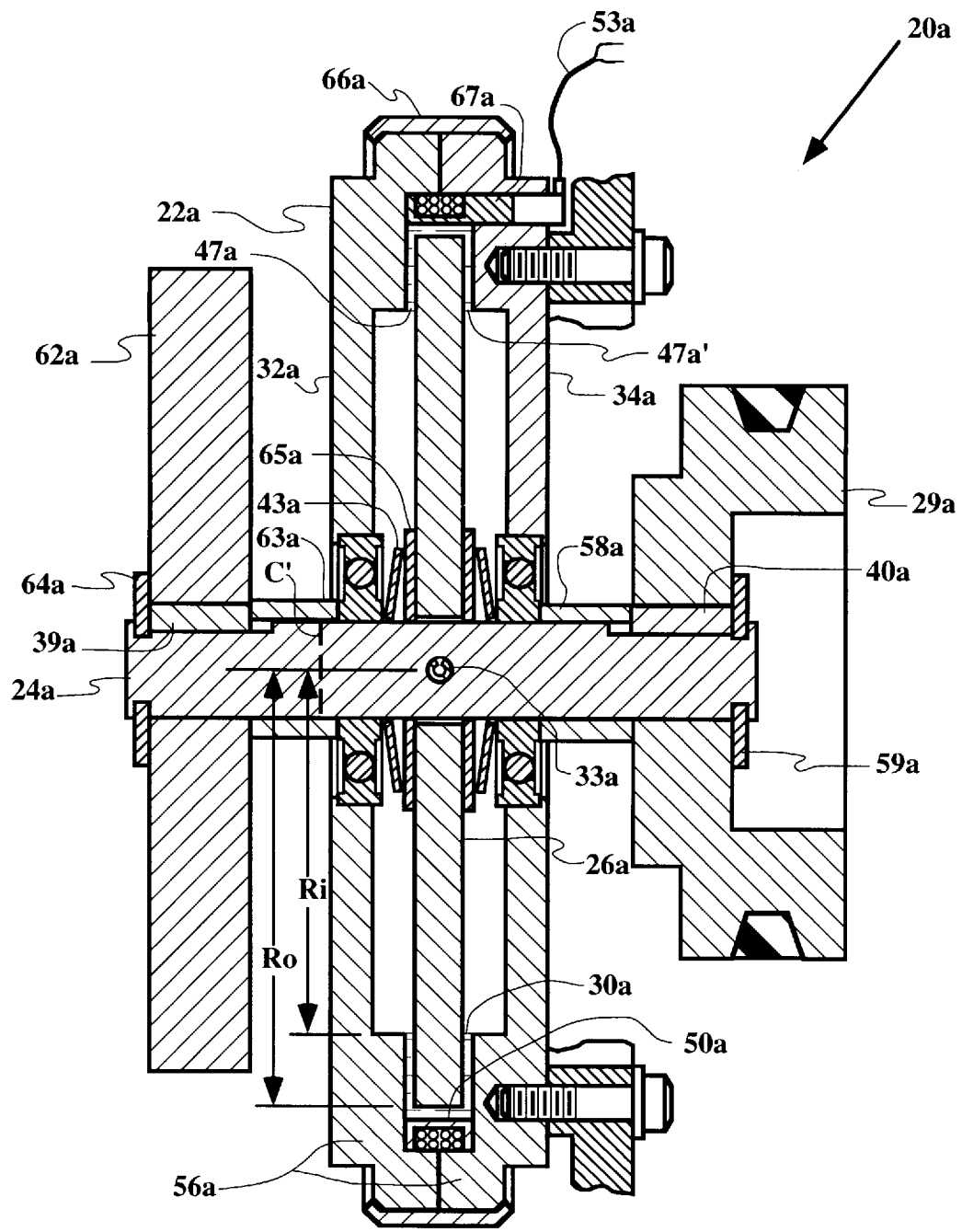
FIG. 2 is a partially sectioned side view of the present invention magnetorheological fluid device illustrating an axially spring-biased rotor.

FIG. 2 illustrates a version of the MR fluid device 20a more likely to be implemented in production. The device 20a is similar to the FIG. 1 embodiment except that a flywheel 62a is attached to shaft 24a. Spacer 63a, key 39a, and clip 64a are used to position the flywheel 62a in proper relation to the housing 22a. In a similar fashion, pulley 29a is fastened to shaft 24a. Spacer 58a, clip 59a, and key 40a fasten and restrain the pulley relative to the shaft 24a.

Washers 65a which are preferably made of nonmagnetic steel such as 300 series stainless, brass, aluminum or the like, abut the rotor 26a and keep the magnetic flux from going into the bearings 44a. The shaft 24a should also be manufactured out of a nonmagnetic material such as 300 series stainless steel or the like. This will reduce the amount of magnetic flux that is bypassing the working region between Ri and Ro and is going into the shaft 24 and bearings 44a. In this embodiment, staking ring 66a is staked over to secure the halves 32 and 34 of housing 22a together. It is notable that the flywheel 62a is optional and shaft 24 may be ended at line C'. In this embodiment, a quick connector 67a molded into the bobbin 50a and is utilized to connect to the lead 53a which has a mating connector formed thereon. The MR fluid 30 is shown in the proper relation to the flux member 56a of the housing 22a and the rotor 26a. The MR fluid 30 is shown in the condition it would be in upon rotation, i.e., when operating. The MR fluid 30 will be evenly disbursed in the gaps 47a and 47a' and preferably will just fill them.

Figures 3, 4:
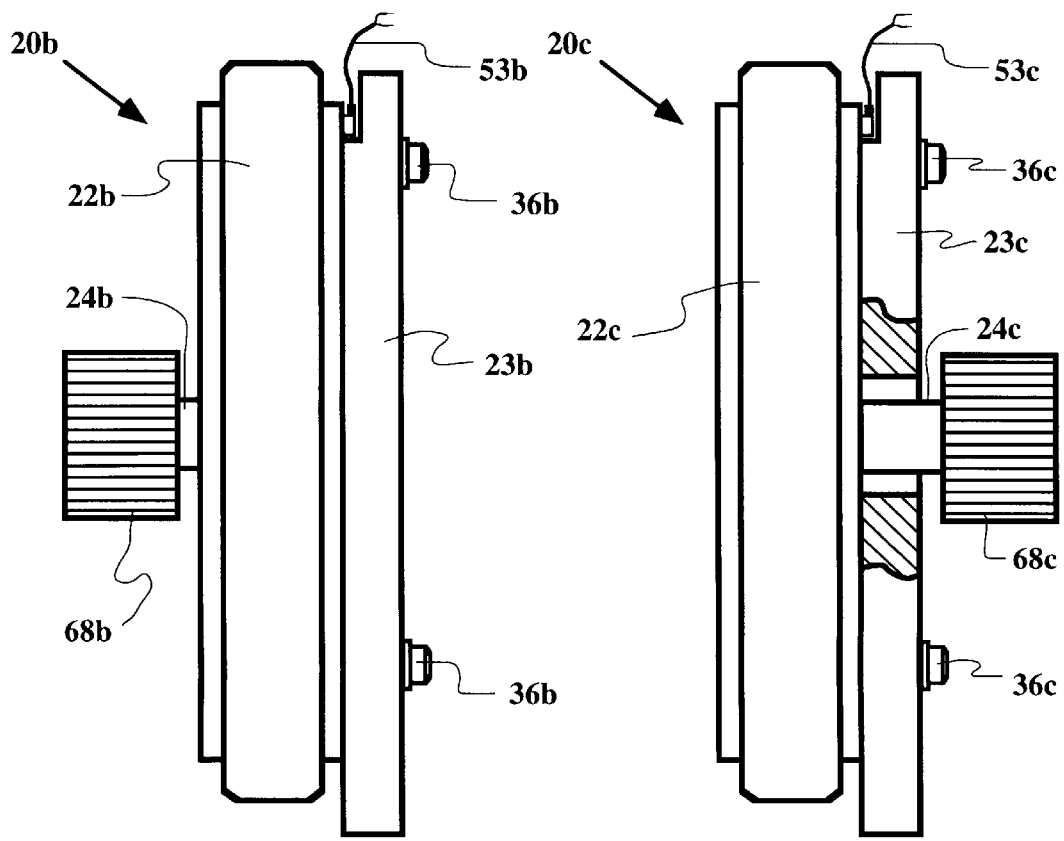
FIG. 3 is a side view of one installation of the fluid device.
FIG. 4 is a side view of another installation of the magnetorheological fluid device.

FIG. 3 and FIG. 4 illustrate several possible installations for the MR fluid device. In these embodiments, a wheel 68b and 68c is attached to the shaft 24b and 24c instead of a pulley. A wheel 68b and 68c such as this can be used for interacting with a bicycle wheel or the like. In the FIG. 3 and 4 embodiments, the housing 22b, 22c is attached to the flange 23b, 23c by way of fasteners 36b, 36c. In the FIG. 4 embodiment, the shaft 24c extends through the flange 23c. This may be preferable as the moment on the flange 23c is minimized.

Figure 5:
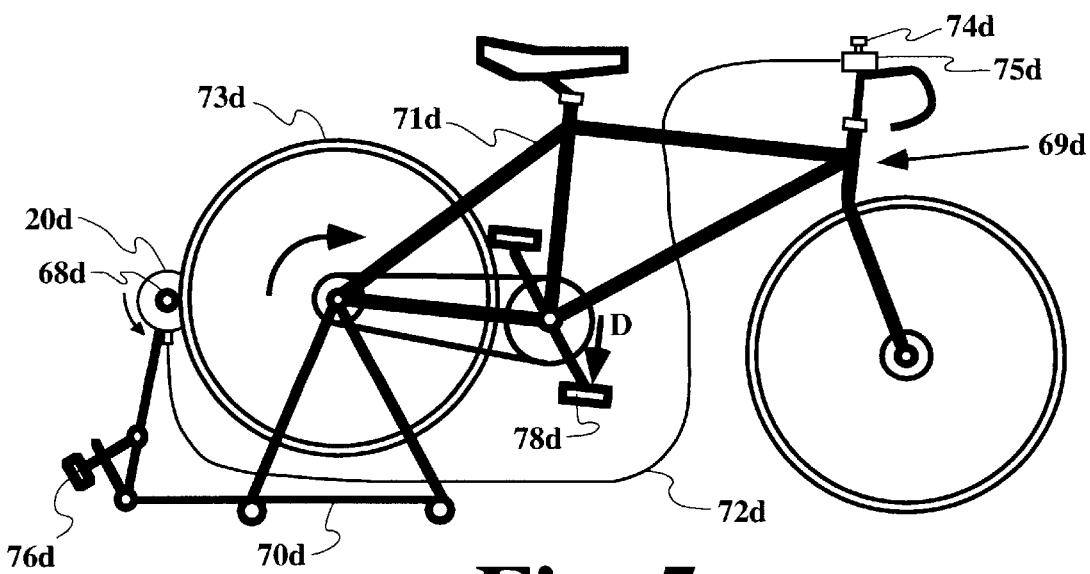
FIG. 5 is a side view of a bicycle stand exercise apparatus utilizing the magnetorheological fluid device.

FIG. 5 illustrates a bicycle 69d having a frame 71d which is fixedly attached to a stand 70d and including a controllable MR fluid device 20d for providing controlled exercising forces to resist the user's pedaling motions as indicated by arrow D applied to pedal 78d. A contact wheel 68d is adjusted via adjustment 76d to contact wheel 73d. The user's exertion of force on pedal 78d causes a rotation of the wheel 73d in the direction shown. This in-turn, drives wheel 68d and thus the internal components of MR fluid device 20d. A sender line 72d attaches between a controller 75d and the MR device 20d. The user can adjust the rotational resistance exerted by the MR device 20d on the wheel 73d by way of adjuster 74d. The MR device 20d can be of the type shown in FIG. 3 and may include the internal components as described in the FIG. 2 embodiment.

Figure 6:
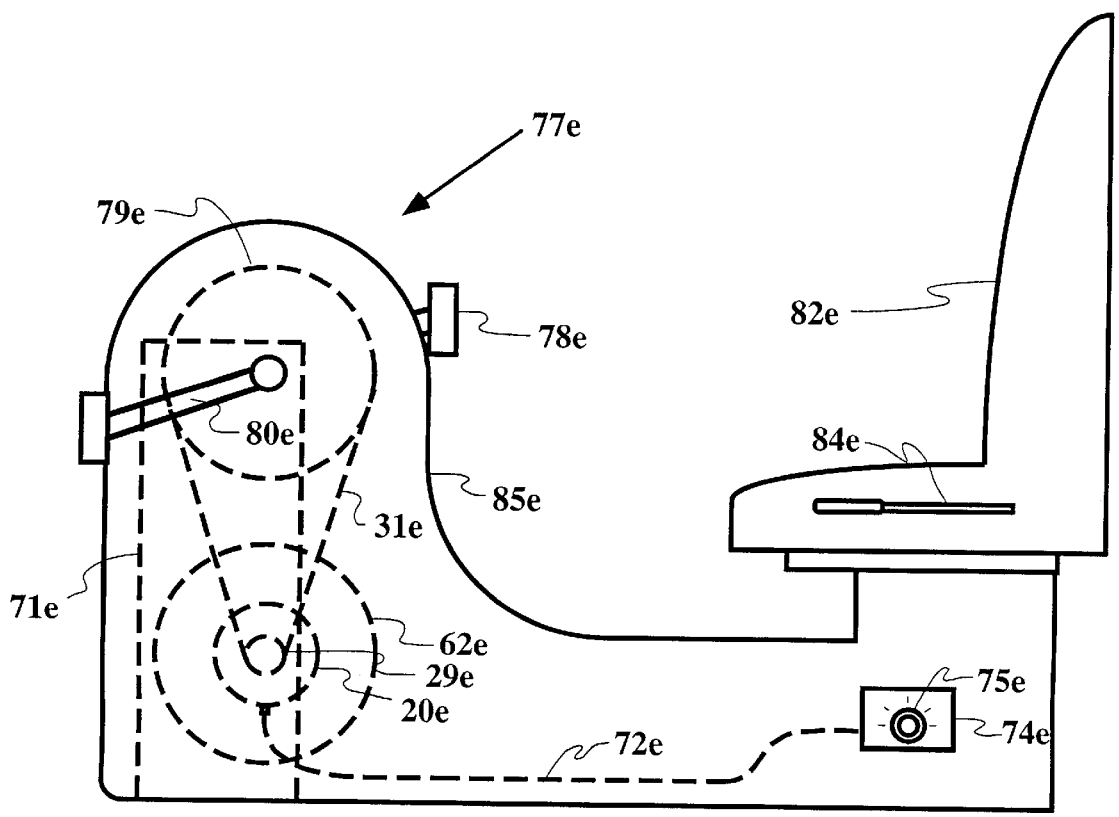
FIG. 6 is a side view of a recumbent exercise apparatus utilizing the magnetorheological fluid device.

FIG. 6 illustrates a recumbent exerciser 77e. The recumbent exerciser 77e includes a body 85e, a frame 71e and a seat 82e with adjuster 84e for adjusting seat position. A controllable MR fluid device 20e attaches to the frame 71e which is fixedly attached to the body 85e. A pulley 79e and v-belt 31e are attached to the crank 80e for transferring the user's rotary motion via pedals 78e to the pulley 29e of MR device 20e. The recumbent exerciser 77e may also include an optional flywheel 62e. The degree of resistance to the user's motions is adjusted by rotating adjustment 74e on controller 75e which adjusts the current applied to the MR fluid device 20e via sender line 72e. It is notable that the shaft of the MR fluid device 20e may also be directly attached to the crank 80e.

Figures 7, 8:
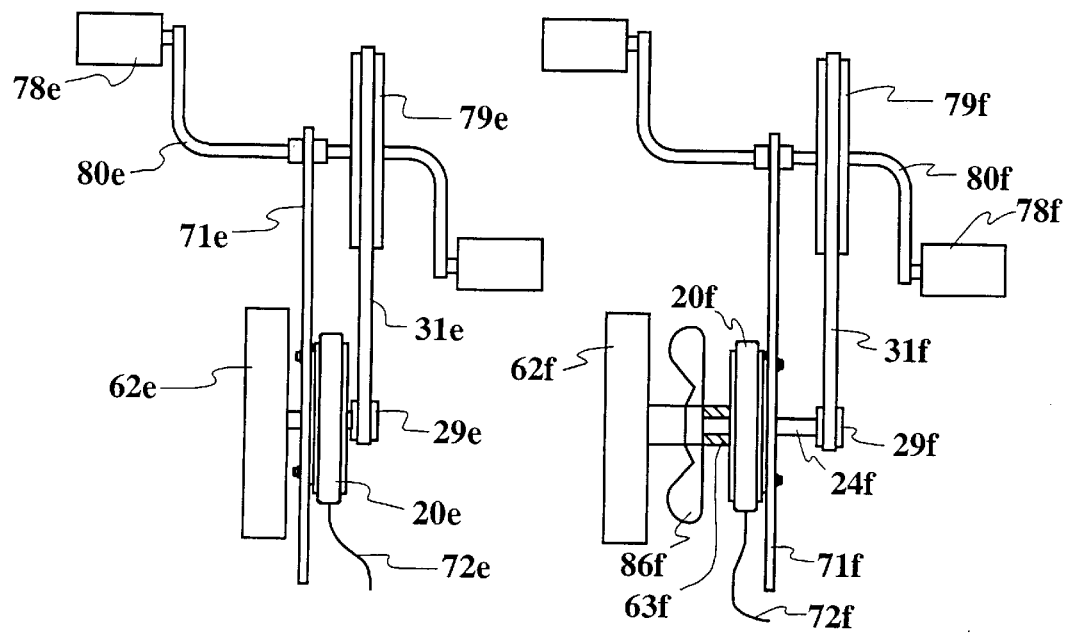
FIG. 7 is a side view of the drive assembly for the recumbent exercise apparatus.
FIG. 8 is a side view of the drive assembly for the recumbent exercise apparatus utilizing a fan for cooling.

FIGS. 7 and 8 illustrate various embodiments of the assembly that can be utilized within the recumbent exerciser 77e. Each assembly includes a crank 80e, 80f supported relative to the frame 71e, 71f. Pedals 78e, 78f also rotatably attach to the crank 80e, 80f. A pulley 79e, 79f is fixedly attached to the crank 80e, 80f such that it rotates preferably one rotation for each rotation input by the user. The rotary motion is amplified by gearing down via use of a v-belt 31e, 31f attached to smaller pulley 29e, 29f attached to the MR fluid device 20e, 20f. The optional flywheel 62e, 62f is chosen to be the proper mass to provide a smooth feel. Sender line 72e, 72f provides the current for controlling the torsional resistance provided by the MR device 20e, 20f.

FIG. 8 illustrates attaching a fan 86f which is spaced via spacer 63f in the vicinity of the MR fluid device 20f to force convection currents over the MR device 20f. Cooling in this fashion is provided by the exertion of the user. Proper ducting in the body 85e can be used to vent out any excess heat generated. The installation is similar to that of the FIG. 4 embodiment.

Figure 9:
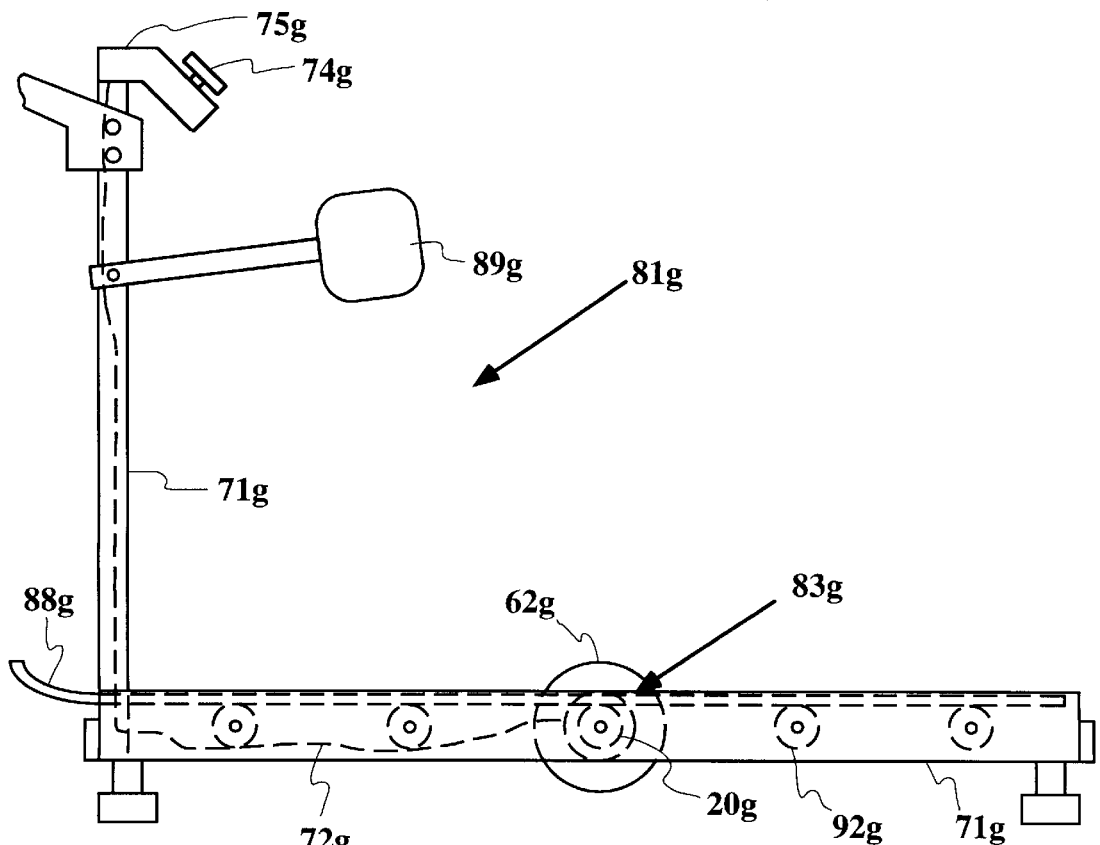
FIG. 9 is a side view of a ski-exercise apparatus utilizing the magnetorheological fluid device.
Figure 10:
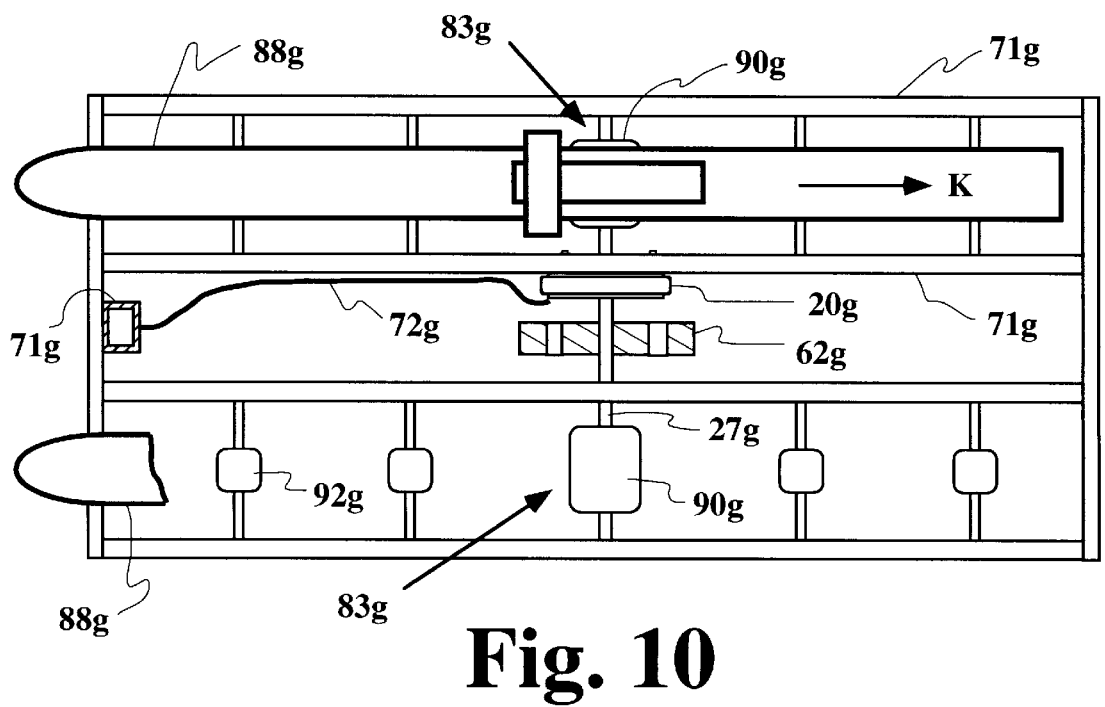
FIG. 10 is a top view of the ski-exercise apparatus.

FIG. 9 and 10 illustrate a ski machine 81g. The ski machine 81g includes a frame 71g for supporting the skis 88g and user, a rest 89g for providing partial support for the user, a clutch mechanism 83g, an MR fluid device 20g and a controller 75g for providing user-resisting forces. The skis 88g rest on rollers 92g and ratchet wheel 90g. As the user exerts a force in an attempt to move forward, i.e., the ski moves in the direction of arrow K shown, the clutch mechanism 83g provided by ratchet wheel 90g is engaged and a resistance force is exerted by the MR fluid device 20g through shaft 27g. However, as the user moves the ski 88g in the opposite direction, the ratchet wheel 90g of the clutch mechanism 83g disengages and the ski 88g is free to move back to its initial position. In this way, the MR device 20g is only rotated in one direction and a resistance force is only applied when the ski is moved in the direction of the arrow K. The optional flywheel 62g adds a smooth feel. Further, slots may be added to the flywheel 62g to aid in providing cooling air to the MR device 20g. The user can adjust the resistance force by adjusting adjuster 74g on controller 75g which controls the current supplied to the MR fluid device 20g.

Figure 11:
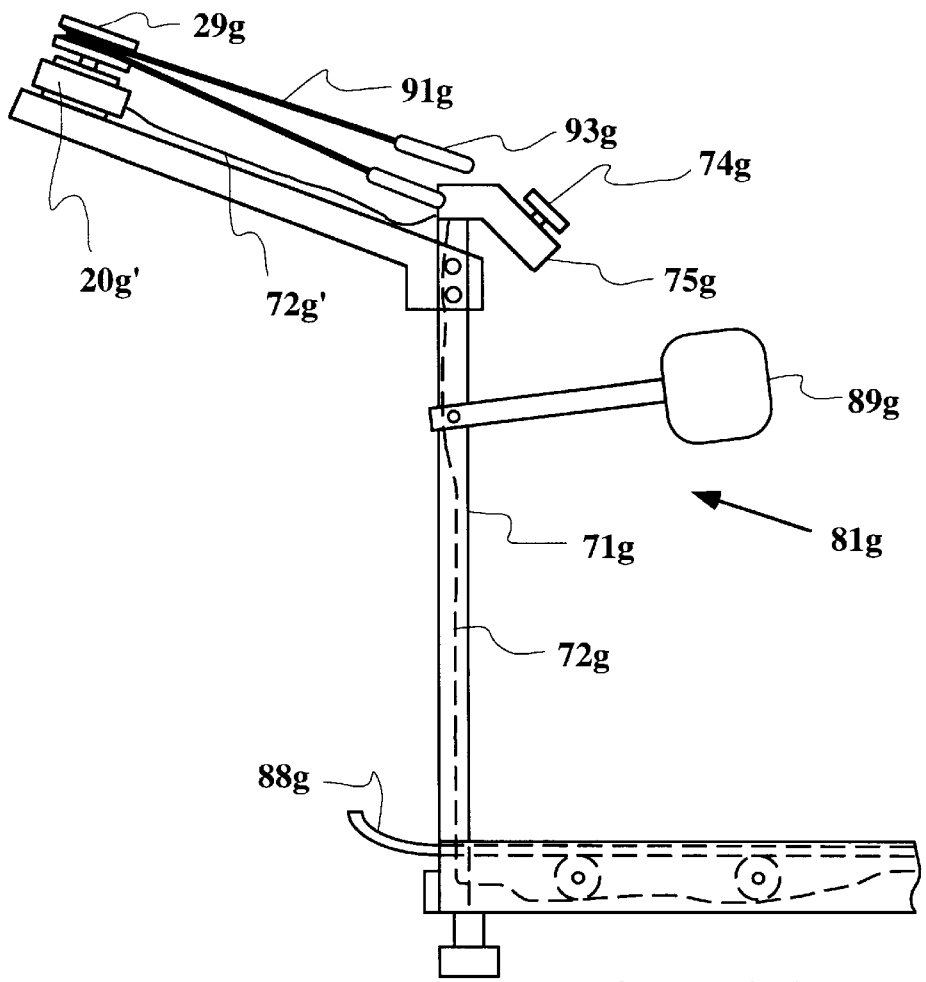
FIG. 11 is a side view of a ski-exercise apparatus utilizing the magnetorheological fluid device for exercising the arms.

FIG. 11 illustrates using a MR fluid device 20g' on a ski exerciser machine 81g for exercising the arms. A cord 91g is attached around the pulley 29g. As the user pulls on each handle 93g, the pulley 29g is rotated and a resistance force is provided by the MR fluid device 20g'. The amount of force can be adjusted by adjuster 74g. A separate adjuster 74g may be used for separate adjustment of the ski and the arm resistance. Notably the ski device 81g may include an MR device 20g', 20g for exercising the legs, arms, or both.

Figure 12:
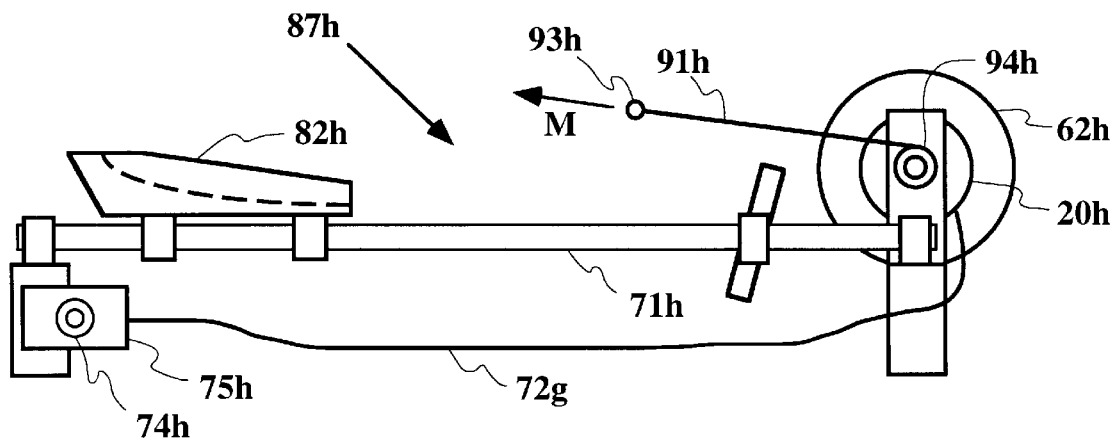
FIG. 12 is a side view of a rowing-exercise apparatus utilizing the magnetorheological fluid device.

FIG. 12 illustrates a rower machine 87h. The rower machine 87h is comprised of a tubular frame 71h having a seat 82h received thereon and slidably engaged therewith. A cord 91h is pulled via a ski rope type handle 93h. This rotates the pulley and clutch mechanism 94h. The pulley and clutch mechanism 94h only allows engagement of the flywheel 62h in one direction. As the user pulls on the cord 91h along the arrow M shown, the clutch and pulley mechanism 94h is engaged and the MR device 20h provides a resistance force. Optional flywheel 62h provides a smooth feel. Upon release of the cord 91h at the end of the exercise cycle, a torsion spring (not shown) rewinds the cord 91h onto the pulley and clutch mechanism 94h. Adjuster 74h on controller 75h controls the current supplied.

Figure 13:
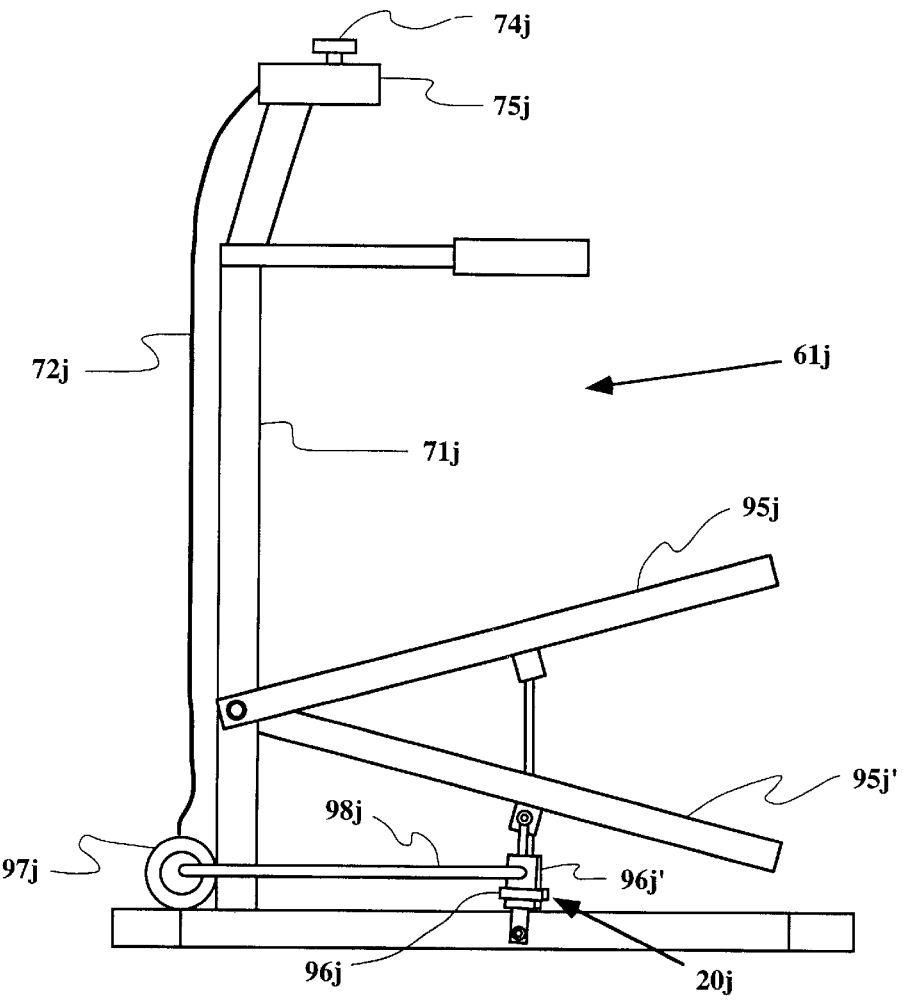
FIG. 13 is a side view of a stair-stepper exercise apparatus utilizing the magnetorheological fluid device.
Figure 14:
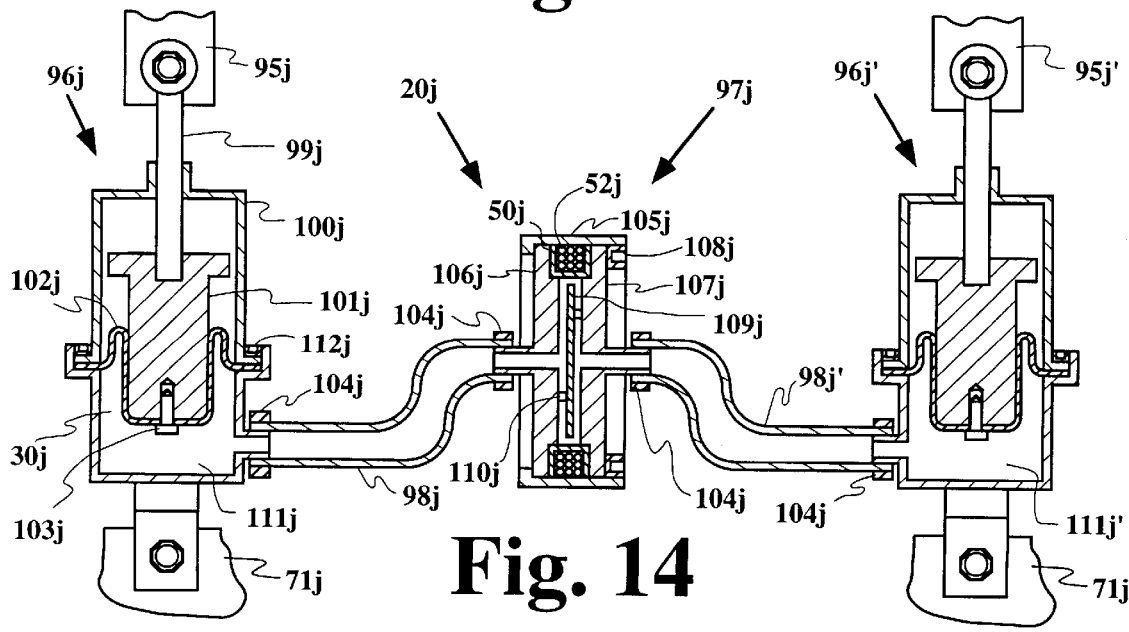

FIG. 13 and 14 illustrate a stair stepper 61j. The stair stepper 61j includes a frame 71j, foot pedals 95j and 95j' rotatably attached to frame 71j on either side thereof, extensible pumps 96j and 96j' each respectively attached between said frame 71j and one each to each of said foot pedals 95 and 95j, valve 97j, passageways 98j and 98j', and controller 75j. The controllable MR fluid device 20j is comprised of the extensible pumps 96j and 96j', the valve 97j, and passageways 98j and 98j'. As the user alternately steps on each of the pedals 95j and 95j', the MR fluid 30j moves from chamber 111j through valve 97j and into chamber 111j'. The MR valve 97j can be selectively energized via the adjuster 74j on controller 75j to provide variable resistance forces. Extensible pump 96j is comprised of a shaft 99j which is slidably received within a housing 100j, a piston 101j attached to said shaft 99j and contained within said housing 100j, and a flexible partition 102j for forming a fluid barrier and forming at least a portion of chamber 111j. Housing 100j is formed of two halves fastened together by assembly ring 112j. Fastener 103j secures flexible partition 102j to piston 101j. Extensible pump 96j' is comprised of identical components. A passageway 98j interconnects chamber 111j and valve 97j. Like passageway 98j' connects chamber 111j with valve. Passageways 96j and 96j' form an external fluid flow path. Hose clamps 104j secure the passageways 98j and 98j' to the valve 97j and extensible pumps 96j and 96j'.

The valve 97j is comprised of halves 106j and 107j which are received in sleeve 105j and held in place by assembly ring 108j. Disk-like baffle plate 109j is held in spaced relation to halves 106j and 107j by spacers 110j. The baffle plate 109j is used to deflect the flow of the MR fluid 30j such that the fluid 30j is exposed to the magnetic field created in vicinity of coil 52j. Bobbin 50j acts as the seal to retain the MR fluid 30j within the valve 97j. The valve 97j is interactive with the MR fluid 30j to control the flow in the external fluid flow path.

While the preferred embodiments of the present invention have been described in detail, various modifications, alterations, changes and adaptations to the aforementioned may be made without departing from the spirit and scope of the present invention defined in the appended claims. It is intended that all such modifications, alterations and changes be considered part of the present invention.

What is claimed is:

1. A magnetorheological fluid device, comprising:
    (a) a shaft for attaching to a first member;
    (b) a rotor having a first rotor surface and a second rotor surface which are outwardly facing and generally radially extending, said rotor having an outer radius Ro defining an outer periphery, said rotor connected to said shaft such that relative rotation is restrained;
    (c) a housing for attaching to a second member, said housing including a hollowed out cavity formed therein defined partially by a flux member which provides a magnetic flux path, said flux member including an inner radius Ri forming an innermost periphery and having a recess formed therein including a first inner surface and second inner surface which face each other, said recess receiving a portion of said rotor and forming a first gap between said first inner surface and said first rotor surface, and a second gap between said second inner surface and said second rotor surface, said inner radius Ri of said flux member and said outer radius Ro of said rotor sized in the ratio of Ri/Ro such that Ri/Ro ratio is between 0.70 and 0.99 such that a minimum amount of steel is required;
    (d) a magnetorheological fluid comprised of ferromagnetic particles disbursed in a viscous fluid contained within and at least partially filling said cavity and substantially filling said first and second gaps; and
    (e) a coil adjacent said first and second gaps for creating a standing magnetic field in said magnetic flux path which causes said magnetorheological fluid to change rheology and cause a change in a restraining force exerted upon said rotor.

2. A device of claim 1 wherein said rotor is spring loaded in the axial direction to maintain a thickness of said first and second gaps.

3. A device of claim 1 wherein said cavity is filled with said magnetorheological fluid such that said cavity is one third full at most thereby minimizing contact of said magnetorheological fluid with a seal in a sealed bearing rotatably supporting said shaft.

4. A device of claim 1 wherein said cavity is partially filled with said magnetorheological fluid which is further comprised of a silicone fluid having a viscosity of between 1000 mPa-s and 50,000 mPa-s and which contains carbonyl iron spheroids.

5. A device of claim 1 wherein said magnetorheological fluid is agitated by at least one selected from a group consisting of a hole formed through said rotor and at least one pin protruding from said rotor.

6. A magnetorheological fluid device, comprising:
    (a) a shaft for attaching to a first member;
    (b) a rotor having a first rotor surface and a second rotor surface which are outwardly facing and generally radially extending, said rotor having an outer radius Ro defining an outer periphery, said rotor connected to said shaft such that relative rotation is restrained;
    (c) a housing for attaching to a second member, said housing including a hollowed out cavity formed therein defined partially by a flux member which provides a magnetic flux path, said flux member including an inner radius Ri forming an innermost periphery and having a recess formed therein including a first inner surface and second inner surface which face each other, said recess receiving a portion of said rotor and forming a first gap between said first inner surface and said first rotor surface, and a second gap between said second inner surface and said second rotor surface;
    (d) a magnetorheological fluid comprised of ferromagnetic particles disbursed in a viscous fluid contained within and at least partially filling said cavity and substantially filling said first and second gaps;
    (e) a coil adjacent said first and second gaps for creating a standing magnetic field in said magnetic flux path which causes said magnetorheological fluid to change rheology and cause a change in a restraining force exerted upon said rotor; and
    (f) spring means for center biasing said rotor relative to said housing such that said first and said second gaps maintain a constant thickness due to said center biasing.

7. A device of claim 6 wherein said cavity is filled with said magnetorheological fluid such that it is one third full at most thereby minimizing contact of said magnetorheological fluid with a seal in a sealed bearing which rotatably supports said shaft relative to said housing.

8. A device of claim 6 wherein said cavity is partially filled with said magnetorheological fluid which is comprised of a silicone fluid having a viscosity of between 1,000 mPa-s and 50,000 mPa-s and carbonyl iron spheroids disbursed in said magnetorheological fluid.

9. A device of claim 6 wherein said magnetorheological fluid is mixed and maintained as a slurry by at least one selected from a group consisting of a hole formed through said rotor and at least one pin protruding from said rotor.

10. A magnetorheological fluid device, comprising:
  (a) a shaft for attaching to a first member;
  (b) a rotor having a first rotor surface and a second rotor surface which are outwardly facing and generally radially extending, said rotor having an outer radius Ro defining an outer periphery, said rotor member connected to said shaft member such that relative rotation is restrained;
  (c) a housing for attaching to a second member, said housing including a hollowed out cavity formed therein defined partially by a flux member which provides a magnetic flux path, said flux member including an inner radius Ri forming an innermost periphery and having a recess formed therein including a first inner surface and second inner surface which face each other, said recess receiving a portion of said rotor and forming a first gap between said first inner surface and said first rotor surface, and a second gap between said second inner surface and said second rotor surface, said inner radius Ri of said flux member and said outer radius Ro of said rotor sized in the ratio of Ri/Ro such that Ri/Ro ratio is between 0.70 and 0.99 such that a minimum amount of steel is required;
  (d) a magnetorheological fluid comprised of ferromagnetic particles disbursed in a viscous fluid contained within and at least partially filling said cavity and substantially filling said first and second gaps;
  (e) a coil adjacent said first and second gaps for creating a standing magnetic field in said magnetic flux path which causes said magnetorheological fluid to change rheology and cause a change in restraining force exerted upon said rotor; and
  (f) spring means for center biasing said rotor relative to said housing such that said first and said second gaps maintain a constant thickness due to said center biasing.

11. A process of controlling a force between a first member and second member which are relatively moveable and are included within a piece of exercise equipment, comprising the steps of:
  (I) attaching between said first member and said second member of said piece of exercise equipment a rotary acting magnetorheological fluid device having a shaft for connection to said first member, a housing for attachment to said second member, said housing including a flux member providing a magnetic flux path, said flux member further including an inner radius Ri, a rotor having an outer radius Ro rotatably secured to said shaft, said rotor being received within a recess formed in said flux member and forming a working section located between said inner radius Ri and outer radius Ro, a magnetorheological fluid containing ferromagnetic particles disbursed within a viscous fluid contained within said working section, a coil adjacent to said working section for generating a magnetic field therein upon electrical energization of said coil thereby causing a change in rheology of said magnetorheological fluid wherein a ratio of Ri/Ro is between 0.7 and 0.99, and
  (II) controlling a force exerted by said magnetorheological fluid device between said first member and said second member in accordance with a magnetic field applied to said magnetorheological fluid by electrical energization of said coil which causes a rheology change of said magnetorheological fluid.

12. A process of claim 11 wherein said rotary acting magnetorheological fluid device is attached to a frame and supplies a resistive force to resist movement of a first ski and a second ski of a ski exercise machine wherein said shaft of said rotary acting magnetorheological fluid device is directly connected to each of said first ski and said second ski by a first and second in-line one-way clutch and roller such that said rotor within said rotary acting magnetorheological fluid device is rotated in one direction only and whereby said shaft is also directly connected to an in-line freely-rotatable flywheel.

13. A process of claim 11 wherein said rotary acting magnetorheological fluid device is attached between and supplies a force between a frame and a crank of stationary exercise cycle further comprising transmission means connected between said crank and said rotary acting magnetorheological fluid device for amplifying rotary motion of said crank applied to said rotary acting magnetorheological fluid device and a flywheel attached to said shaft of said rotary acting magnetorheological fluid device.

14. A process of claim 11 wherein said rotary acting magnetorheological fluid device is cooled by convection currents supplied by a fan unit attached to said shaft directly adjacent to said rotary acting magnetorheological fluid device.

15. A process of claim 11 wherein said rotary acting magnetorheological fluid device is attached between and supplies a force between a frame and a rowing handle of rower machine further comprising a clutch mechanism for providing engagement of said rotary acting magnetorheological fluid device during a pull stroke thereby allowing only undirectional rotary motion of said rotor and a spring for retracting said rowing handle during a release stroke and a flywheel attached to said shaft of said rotary acting magnetorheological fluid device.

16. A process of claim 11 wherein said first member is a frame and said second member is a wheel of a bicycle and wherein said rotary acting magnetorheological fluid device includes a housing for attachment to said frame and a contact wheel attached to said shaft which abuts said wheel of said bicycle and supplies a force to resist rotary motion of said wheel of said bicycle.

17. A process of controlling a force between two relatively moving first and second members included within a piece of exercise equipment, comprising the steps of:
  (I) attaching a rotary-acting magnetorheological fluid device containing a magnetorheological fluid between said first member and said second member, and
  (II) controlling a force exerted by said rotary-acting magnetorheological fluid device between said moving members in accordance with a magnetic field applied to said magnetorheological fluid, wherein said rotary-acting magnetorheological fluid device further comprises:

(a) a shaft for attaching to a first member;
(b) a rotor having a first rotor surface and a second rotor surface which are outwardly facing and generally radially extending, said rotor having an outer radius Ro defining an outer periphery, said rotor connected to said shaft such that relative rotation is restrained;
(c) a housing for attaching to a second member, said housing including a hollowed out cavity formed therein defined partially by a flux member which provides a magnetic flux path, said flux member including an inner radius Ri forming an innermost periphery and having a recess formed therein including a first inner surface and second inner surface which face each other, said recess receiving a portion of said rotor and forming a first gap between said first inner surface and said first rotor surface, and a second gap between said second inner surface and said second rotor surface, said inner radius Ri of said flux member and said outer radius Ro of said rotor sized in the ratio of Ri/Ro such that Ri/Ro ratio is between 0.70 and 0.99 such that a minimum amount of steel is required;
(d) a magnetorheological fluid comprised of ferromagnetic particles disbursed in a viscous fluid contained within and at least partially filling said cavity and substantially filling said first and second gaps;
(e) a coil adjacent said first and second gaps for creating a standing magnetic field in said magnetic flux path which causes said magnetorheological fluid to change rheology and cause a change in restraining force exerted upon said rotor; and
(f) spring means for center biasing said rotor relative to said housing such that said first and said second gaps maintain a constant thickness due to said center biasing.

18. The process of claim 17 wherein said cavity is filled with said magnetorheological fluid such that said cavity is one third full at most thereby minimizing contact of said magnetorheological fluid with a seal in a sealed bearing rotatably supporting said shaft.

19. The process of claim 17 wherein said cavity is partially filled with said magnetorheological fluid which is further comprised of a silicone fluid having a viscosity of between 1000 mPa-s and 50,000 mPa-s and which contains carbonyl iron spheroids.

20. The process of claim 17 wherein said magnetorheological fluid is mixed by at least one selected from a group consisting of a hole formed through said rotor and at least one pin protruding from said rotor.

21. A process of controlling a torque between two relatively moving first and second members included within a piece of exercise equipment, comprising the steps of:
(I) attaching a rotary acting magnetorheological fluid device between said two relatively moving first and second members wherein said rotary acting magnetorheological fluid device is further comprised of;
(a) a shaft for connection to said first member,
(b) a rotor having a first rotor surface and a second rotor surface which are outwardly facing and generally radially extending, said rotor having an outer radius Ro defining an outer periphery, said rotor connected to said shaft such that relative rotation is restrained,
(c) a housing for connection to said second member, said housing including a hollowed out cavity formed therein defined partially by a flux member which provides a magnetic flux path, said flux member including an inner radius Ri forming an innermost periphery and having a recess formed therein including a first inner surface and second inner surface which face each other, said recess receiving a portion of said rotor and forming a first gap between said first inner surface and said first rotor surface, and a second gap between said second inner surface and said second rotor surface, said inner radius Ri of said flux member and said outer radius Ro of said rotor sized in the ratio of Ri/Ro such that Ri/Ro ratio is between 0.70 and 0.99 such that a minimum amount of steel is required,
(d) a magnetorheological fluid comprised of ferromagnetic particles disbursed in a viscous fluid contained within and at least partially filling said cavity and substantially filling said first and second gaps, and
(e) a coil adjacent said first and second gaps for creating a standing magnetic field in said magnetic flux path which causes said magnetorheological fluid to change rheology, and
(II) controlling a force exerted by said rotary acting magnetorheological fluid device between two relatively moving first and second members via electrically energizing said coil.

22. A process of claim 21 wherein said rotary acting magnetorheological fluid device supplies a force between a frame and a ski of a ski exercise machine wherein said shaft of said rotary acting magnetorheological fluid device is directly connected to said ski by a one-way clutch and roller such that said rotor within said rotary acting magnetorheological fluid device is rotated in one direction only.

23. A process of claim 22 wherein a second rotary acting magnetorheological fluid device is attached to said frame provides for exercise of a user's arms.

24. A process of claim 21 wherein said magnetorheological fluid device is cooled by convection currents supplied by a fan adjacent to said rotary acting magnetorheological fluid device.

25. A process of claim 21 wherein said rotary acting magnetorheological fluid device further includes a flywheel connected to said shaft.

26. A process of claim 21 wherein said rotary-acting magnetorheological fluid device attaches between a frame and a crank of stationary exercise cycle.

27. A process of claim 26 further including transmission means attached between said crank and said rotary-acting magnetorheological fluid device.

28. A process of claim 27 wherein said transmission means includes means for amplifying rotary motion transmitted to said rotary-acting magnetorheological fluid device.

29. A process of claim 21 wherein said rotary acting magnetorheological fluid device is attached between a frame and a rowing handle of rower machine.

30. A process of claim 21 wherein said rotary acting magnetorheological fluid device includes a contact wheel attached to said shaft wherein said contact wheel directly contacts a wheel of a bicycle and provides controllable rotary torques to resist rotary motion of said wheel.

31. A rotary acting magnetorheological fluid apparatus included in a piece of exercise equipment, comprising:
(a) a shaft;
(b) a rotor which is rotatably connected to said shaft;

(c) a flux member providing a flux path and having a recess formed therein for receiving a portion of said rotor thus forming a first gap and a second gap adjacent said rotor;

(d) a magnetorheological fluid comprised of ferromagnetic particles disbursed in a viscous fluid contained within said first gap and said second gap;

(e) a coil adjacent said first gap and said second gap for creating a magnetic field within said flux path which causes said magnetorheological fluid in said first gap and said second gap to change rheology and exert a force upon said rotor; and (f) a flywheel interconnected to said shaft.

32. A magnetorheological fluid apparatus of claim 31 wherein said apparatus further includes means for amplifying rotary motion of said flywheel.

* * * * *